United States Patent [19]

Franke et al.

[11] Patent Number: 5,395,888
[45] Date of Patent: Mar. 7, 1995

[54] THERMOPLASTICALLY PROCESSIBLE POLY-VINYLARENE/POLYURETHANE BLOCK COPOLYMERS

[75] Inventors: Joachim Franke, Cologne; Kurt P. Meurer, Koenigswinter; Peter Haas, Haan; Josef Witte, Cologne, all of Germany

[73] Assignee: Bayer Aktiengesellschaft, Leverkusen, Germany

[21] Appl. No.: 201,914

[22] Filed: Feb. 25, 1994

Related U.S. Application Data

[63] Continuation of Ser. No. 429,250, Oct. 27, 1989, which is a continuation of Ser. No. 327,943, Mar. 23, 1989, abandoned, which is a continuation of Ser. No. 131,957, Dec. 11, 1987, abandoned.

[30] Foreign Application Priority Data

Dec. 20, 1986 [DE] Germany ................ 36 43 789.1

[51] Int. Cl.$^6$ ............... C08L 75/04; C08L 75/12
[52] U.S. Cl. ..................... 525/131; 525/90
[58] Field of Search ............................ 525/131

[56] References Cited

U.S. PATENT DOCUMENTS

| | | | |
|---|---|---|---|
| 3,823,201 | 7/1974 | Pizzini et al. | 260/861 |
| 3,824,201 | 7/1974 | McGranaghan et al. | 260/18 |
| 4,287,314 | 9/1981 | Fava | 525/130 |
| 4,299,924 | 11/1981 | Nomura et al. | 521/131 |
| 4,347,338 | 8/1982 | Torii et al. | 525/123 |
| 4,456,730 | 6/1984 | Balle et al. | 524/839 |
| 4,521,546 | 6/1985 | O'Connor et al. | 521/137 |
| 5,242,977 | 9/1993 | Franke et al. | 525/90 |

FOREIGN PATENT DOCUMENTS

| | | |
|---|---|---|
| 2237956 | 2/1974 | Germany . |
| 2704424 | 8/1978 | Germany . |
| 51-067560 | 6/1976 | Japan . |
| 55-107433 | 8/1980 | Japan . |
| 1311211 | 3/1973 | United Kingdom . |

OTHER PUBLICATIONS

M. Rutkowska and A. Eisenberg, Journal of Applied Polymer Science, No. 29, 1984, pp. 755–762.
M. Rutkowska, A. Eisenberg, Journal of Applied Polymer Science, vol. 30, 1985, pp. 3317–3323.
C. Frisch, Pure and Applied Chemistry, vol. 43, pp. 229–245, 1975
D. Kaplan and N. Tschoegl, Polymer Engineering and Science, 1975, p. 343, vol. 15.
S. Kim, D. Klempner and K. Frisch, Polymer Engineering and Science, 1975, vol. 15, p. 339.
K. Kircher and G. Menges, Plastics Engineering, 1976, vol. 32, p. 37.
Reinforced Plastics, vol. 28, 1984, No. 8, pp. 209–211.
H. Okamoto, et al, International Polymer Science and Technology, vol. 4, 1977, p. 50.
W. Konter, et al, Makromol. Chem. 182, 1981, pp. 2619–2632.
Journal of Polymer Science, Part A-1, vol. 7, pp. 1343–1347, by M. Berger, et al.
Journal of Polymer Science, 1986, pp. 803–808, Part C. No. 23.
Journal of Polymer Science, 1970, pp. 2171–2180, Part A-1, vol. 8.

*Primary Examiner*—Ana L. Carrillo
*Attorney, Agent, or Firm*—Joseph C. Gil; Godfried R. Akorli; Lyndanne M. Whalen

[57] ABSTRACT

A substantially linear poly-vinylarene/polyurethane block copolymer prepared by reacting (1) a difunctional poly-vinylarene which is produced by anionic polymerization and which contains isocyanate-reactive groups, (2) a diisocyanate or an isocyanate prepolymer, and (3) a diol having a high molecular weight or a chain extender having a lower molecular weight, is disclosed to be suitable for the preparation of shaped articles, coatings, coupling agents and compatibilizers.

5 Claims, No Drawings

THERMOPLASTICALLY PROCESSIBLE POLY-VINYLARENE/POLYURETHANE BLOCK COPOLYMERS

This application is a continuation, of application Ser. No. 07/429,250, filed Oct. 27, 1989, which is a continuation of Ser. No. 07/327,943, filed Mar. 23, 1989, now abandoned, which was a continuation of Ser. No. 07/131,957, filed Dec. 11, 1987 (now abandoned).

FIELD OF THE INVENTION

The invention is directed of thermoplastic polymers and more particularly to poly-vinylarene/polyurethane block copolymers.

SUMMARY OF THE INVENTION

The present invention relates to novel, substantially linear poly-vinylarene/polyurethane block copolymers (PVA/PUR block copolymers) preferably polystyrene produced by reacting 1) difunctional and optionally monofunctional poly-vinylarene-olefins, which are produced by anionic polymerization and have end-groups which are reactive towards isocyanate groups, with 2) diisocyanate or isocyanate prepolymers and optionally 3) higher molecular diols and optionally 4) lower molecular difunctional chain extenders, wherein at least one diol 3) or chain extender 4) must be used.

BACKGROUND OF THE INVENTION

Thermoplastically processible, substantially linear PVA/PU block copolymers, preferably polystyrene/polyurethane block copolymers could not be made available hitherto.

PVA/PUR mixtures are known. Thus, in accordance with GB 1,311,211 moisture-setting PUR prepolymers are mixed with polystyrene resins and the mixtures are used for sealing concrete surfaces. Expandable polystyrene beads can be processed together with PUR raw materials with heating to form a foam as described in JA 55 107 433 and JA 51 067 560.

To improve its impact resistance, thermoplastic PUR can be blended with from 40 to 60% of a maleic imide/styrene copolymer according to U.S. Pat. No. 4,287,314 and EP 41 347.

Some works such as Ruthkowska, Eisenberg, J. Appl. Polym. Sci. 29 (1984) No. 3, page 755; and 30 (1985) No. 5, page 3317 describe the miscibility of PUR with styrene/styrene sulphonic acid copolymers.

There are no fixed covalent bonds between the two components in any of these mixtures.

Fixed bonds between polyurethane and polystyrene segments do exist in the so-called interpenetrating polymer networks. Cross-linked PUR systems and cross-linked polystyrene systems are made up by simultaneous, independent polymer build up. Owing to the simultaneously interpenetrating networks, the polymers are joined together rigidly without covalent or ionic bonds existing among one another. The products can no longer be processed thermoplastically. (literature, for example: Frisch, Pure Appl. Chem. 43, (1975) page 229, Kaplan, Tschoegl, Polym. Eng. Sci., 15 (1975) page 343. Kim. Polym. Eng. Sci., 15 (1975), page 339, Kircher, Plast. Eng., 32(1976) page 32).

Compounds which have rigid covalent bonds between the PUR chains and polystyrene chains are obtained either by grafting of styrene on polyurethane with the aid of radical forming agents such as azodiisobutyronitrile (DOS 2,237,956, U.S. Pat. No. 4,299,924, DOS 3,223,396) or by radical copolymerization of unsaturated polyurethanes with styrene (U.S. Pat. No. 3,824,201, DOS 2,359,617, U.S. Pat. No. 4,521,546, DOS 2,704,424, Reinf. Plast. 28 (1984) No. 8, pages 209 to 211). These are radically cross-linked systems with markedly non-uniform molecular weight distribution, in particular of polystyrene segments. These products cannot be processed thermoplastically owing to the cross-linked structure and are therefore unsuitable for many applications, for example as coupling agents and/or polymer modifiers.

Telechelic styrene oligomers produced by radical polymerization with terminal amino and hydroxy groups have already been used for the production of polystyrene/polyurethane block copolymers. Okamoto (Int. Polym. Sci. Technol. 4 (1977), page 50) describes the addition of amino-terminated styrene oligomers during one-shot PU-synthesis, by which the mechanical properties are improved. Similar telechelatic polymers are described by Konter in Makrotmol. Chem. 182 (1981), page 2619. They are used as components in segmented and foamed PUR.

Polystyrenes produced by radical polymerization not only display a broad molecular weight distribution ($M_w \neq M_n$) but also lead to cross-linked end products, owing to the functional groups inside the chain which are undesirably formed during the necessary hydrogenation of the terminal nitrile group. There is therefore a risk that no thermoplastic block copolymers will be obtained if the functionality and therefore cross-linking are too high.

DETAILED DESCRIPTION OF THE INVENTION

Surprisingly, these disadvantages do not arise with the PVA/PUR block copolymers according to the invention. Substantially linear block copolymers are obtained if anionically polymerized vinylarenes are used for it's preparation.

Polymers which can be used directly as shaped articles or coatings, but to greater advantage as coupling agents, compatibility improvers and in particular, dispersants are obtained by coupling the normally incompatible PVA and PUR systems.

The invention therefore relates to thermoplastically processible, substantially linear poly-vinylarenes/polyurethane block copolymers (PVA/PUR block copolymers), obtained by reaction of 2) poly-vinylarenes having a molecular weight $M_w$ of from 1,000 to 350,000, preferably from 2,000 to 200,000, in particular from 2,000 to 100,000 which have been produced by anionic polymerization and contain at the most two groups capable of reacting with isocyanate groups, with 2) organic diisocyanate, modified diisocyanates and corresponding isocyanate prepolymers, and optionally, 3) high molecular weight diols, preferably having a molecular weight of from 400 to 5,000 and optionally, 4) low molecular weight compounds acting as chain extenders and having a molecular weight of from 32 to 399, preferably organic dihydroxy compounds, difunctional amine alcohols or difunctional amines wherein at least one diol 3) or chain extender 4) must be used.

The telechelic poly-vinylarenes, preferably polystyrenes may be produced by anionic polymerization in aliphatic or aromatic solvents such as benzene, toluene, cyclohexane, tetrahydrofuran or dioxane in absence of water, Monofunctional poly-vinylarenes, preferably polystyrenes with defined molecular weights ($M_w = 1,000$ to 150,000) and narrow molecular weight distributions (ratio $M_w/M_n - 1 \leqq 0.1$) can be produced with organometallic initiators such as secondary butyllithium or n-butyllithium (see M. Morton, L. J. Fetters, Rubber Chem. Technol., 48 (1975) page 359).

The carboxylation of the living polystyrene anions with gaseous carbon dioxide is also known, but it is difficult to prevent the formation of dimeric ketones or trimeric tertiary alcohols (see D. P. Wyman, V. R. Allen, T. Altares, J. Polym. Sci., Part A, 2 (1964), Page 4545; P. Mansson, J. Polym. Sci., Polym. Chain. Ed., 18 (1980) page 1945; DE-PS 1,520,468, Phillips Petrol. Company, 1970 and patent literature cited therein).

Difunctional polystyryl anions with defined molecular weights ($M_w = 1,000$ to 100,000 g/mol) and a narrow molecular weight distribution are known (F. Bandermann, A. D. Speikamp. L. Weigel. Makrotmol. Chem. 186 (1985) pages 2017-2024 and N. N. Berger, J. J. K. Boulton, B. W. Brooks, Journal of polymer Science, Part A-1, pages 1343-1346).

Generally speaking, poly-vinylarenes mono or dicarboxylic acids, preferably polystyrene-mono- or dicarboxylic acids are produced such that styrene is added dropwise in its absoluted form (pre-dried over aluminum oxide) under an inert gas atmosphere in an autoclave which has been filled with a dry mixture of cyclohexane and tetrahydrofuran.

At a temperature of 0° C., n-butyllithium or naphthalenelithium, for example, is sprayed in under nitrogen. After the desired polymerization time, the solution of the living oligostyrene anions is treated under pressure with dry carbon dioxide. After a treatment with, for example, glacial acetic acid/water, the solvents are distilled off under a water Jet vacuum and the polystyrene mono or dicarboxylic acids precipitated in ethanol and dried under a vacuum. The carboxyl content can be determined by titration using KOH/methanol or by IR-spectroscopic analysis. The molecular weights ($M_w$, $M_n$), chemical and molecular uniformity and possible presence of long chain branching are determined by gel permeation chromatography in THF.

The reaction of the poly-vinylarenes, preferably of the polystyrene compound, with isocyanates takes place either through the carboxyl, amine or OH groups or through the lithium salt of the polystyrene anions themselves.

These poly-vinylarene mono- or dicarboxylic acids as well as OH, —NH$_2$ terminated poly-vinylarene-olefins as well as poly-vinylarene-(di)-anions may be reacted directly with isocyanates. The production of the corresponding telechelatic compounds is known (see R. N. Young, R. P. Quirk and L. J. Fetters "Anionic Polymerizations of Non-Polar Monomers Involving Lithium" in Adv, Polym. Sci. 56, Chapter 15, pages 70 to 82 (1984), Springer Verlag Heidelberg; M. Swarc, Adv. Polym. Sci 49 (1983), "Living Polymers and Mechanismus of Anionic Polymerization", Springer Verlag Heidelberg).

For producing the telechelic poly-vinylarenes there are used, in particular, olefins corresponding to the general formula (I)

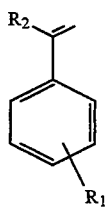

(I)

in which $R_1$ represents a $C_6$-$C_{10}$ aryl radical, a heteroalkyl radical containing $C_1$-$C_{10}$ and at least one member selected from the group consisting of N—, O— and S— atoms, a $C_1$-$C_4$ alkyl radica a hydrogen or a halogen atom, preferably Cl, or Br, $R_2$ represents a $C_1$-$C_6$ alkyl radical or hydrogen, a a heteroalkyl radical containing $C_1$-$C_{10}$ and at least one member selected from the group consisting of N—, O— and S— atoms.

It is particularly preferable to use styrene.

The above mentioned telechelic PVA with terminal carboxyl groups can also be converted into polymers with other terminal groups which are reactive towards isocyanate groups.

This conversion of the carboxylic acid groups can be carried out either directly by oxidation, reduction or transposition into other NCO-reactive groups or by reaction of the carboxylic acid groups with other difunctional compounds corresponding to general formula (II)

$$A\text{—}R\text{—}B \qquad (II),$$

in which

R represents a $C_1$-$C_{20}$, preferably $C_1$-$C_{10}$ aliphatic radical, $C_6$-$C_{20}$, preferably $C_6$-$C_{12}$ aromatic radical or $C_7$-$C_{30}$, preferably $c_7$-$C_{20}$ aliphatic-aromatic radical, A represents a functional group capable of reacting with carboxylic acid groups, preferably a hydroxyl or amino group, B represents a functional group capable of reacting with isocyanate groups, preferably a hydroxyl, amino, thio or epoxide group.

Suitable difunctional compounds are found in Houben-Weyl E 4, Pages 768 to 784.

Examples of such compounds include diols and/or amino alcohols such as ethylene glycol, butane diol-1,4, 2,2-dimethylpropanediol-1,3, ethanolamine or diethanoiamine.

An increase in the reactivity of the poly-vinylarene carboxylic acid may be accomplished for example by conversion into carboxylic acid halides, preferably into carboxylic acid chlorides.

These poly-vinylarene carboxylic acid chlorides can be obtained by reacting poly-vinylarene carboxylic acids having a $M_n$ of from 1,000 to 350,000 with halogenating agents, preferably with chlorinating agents, for example with thionyl chloride, optionally in an organic solvent, for example in aliphatic, cycloaliphatic or aromatic solvents. Organic solvents, preferably halogenated or alkylated aromatic hydrocarbons such as toluene or chlorobenzene are preferred.

To produce the PVA/PUR block copolymers according to the invention, the telechelic polymers are first reacted with organic diisocyanates 2). Diisocyanates corresponding to general formula X(NCO)$_2$ are preferably used, wherein X represents, in particular, an aliphatic hydrocarbon radical containing from 4 to 12 carbon atoms, a cycloaliphatic hydrocarbon radical containing from 6 to 15 carbon atoms, an aromatic hydrocarbon radical containing from 6 to 15 carbon atoms or an araliphatic hydrocarbon radical containing from 7 to 15 carbon atoms.

Examples of preferred diisocyanates are tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-methylene bis-cyclohexyldiisocyanate, 4,4'-diisocyanato-dicyclohexylpropane(2,2), 1,4-diisocyanatobenzene, 2,4-diisocyanatotoluene, 2,6-diisocyanatotoluene, and isomeric mixtures thereof, 4,4'-diisocyanato-diphenylmethane, p-xylylene diisocyanate, and α,α,α',α'-tetraethyl- m- or xylylene diisocyanate or mixtures composed of these compounds.

It is also possible to use modified diisocyanates which are known in polyurethane chemistry and contain, for example, carbodiimide groups, allophanate groups, isocyanurate groups, urethane groups and/or biuret groups proportionally or alone.

The high molecular weight diols which are reactive towards isocyanate groups, contain Zerewitinoff-active hydrogen atoms and are suitable for the production of PVA/PUR block copolymers according to the invention. These are synthesis units known from polyurea polyurethane chemistry such as polyether diols, polyester diols, polycarbonate diols, polylactones, modified diols containing amino groups, preferably having a molar weight of from 400 to 5,000.

Organic low molecular weight difunctional compounds having a molecular weight of from 32 to 399 may be used as chain extenders suitable as starting material 4) for the PVA/PUR block copolymers according to the invention. These are, in particular, difunctional chain extenders having a molecular weight in the range of from 32 to 399, preferably from 62 to 250.

These include, for example, simple difunctional alcohols such as ethylene glycol, propylene glycol, propane diol-(1,3), butane diol-1,4, hexane diol-1,6, also lower molecular weight polyester diols such as adipic acid-bis-(hydroxyethyl) ester or lower molecular weight diols containing ether groups such as diethylene glycol, triethylene glycol, tetraethylene glycol, dipropylene glycol, tripropylene glycol or tetrapropylene glycol as well as difunctional amines.

Compounds of types 3) and 4) are listed on pages 11 to 20 of DE-A 2,832,253.

The invention also relates to a process for the production of a poly-vinylarene/polyurethane block copolymer comprising reacting
1) poly-vinylarenes having a $M_w$ of from 1,000 to 350,000 and groups capable of reacting towards isocyanate groups, with
2) organic diisocyanates or modified diisocyanates and corresponding isocyanate prepolymers and optionally with
3) high molecular weight diols, preferably polyether diols, polyester diols, polycarbonate diols, polyactones, modified diols containing amino groups, preferably having a molecular weight of from 400 to 5,000 and optionally with
4) low molecular weight chain extenders having a molecular weight of from 32 to 399, preferably organic dihydroxy compounds or difunctional amines, wherein at least one diol 3) or chain extender 4) must be used.

One of the preferred embodiments of the process according to the invention for the production of PVA/PUR block copolymers is characterized in that the functional PVA 1) are first reacted with the diisocyanates or with isocyanate prepolymers 2) in the melt or in the presence of an inert organic solvent (such as acetone, N-methyl-pyrrolidone, toluene, chlorobenzene, dichlorobenzene) to form a prepolymer containing isocyanate groups which are still free and, in a second stage, the remaining free NCO-groups are reacted completely or in part with high molecular weight dihydroxy compounds 3) and optionally in a third stage, the remaining free isocyanate groups are reacted with one or more organic compounds 4) having a molecular weight of from 32 to 399 selected from among dihydroxy compounds, amine and hydrazine chain extenders.

The process according to the invention for the production of PVA/PUR block copolymers can also be carried out in such a way that the diisocyanates 2) are first reacted in the melt or in the presence of an inert organic solvent such as acetone, N-methylpyrrolidone, toluene, chlorobenzene etc. with the organic high molecular weight dihydroxy compounds 3) to form a prepolymer containing NCO groups which are still free and, in the second stage, the remaining free NCO groups are reacted completely or in part with the functionalized PVA and, optionally in a third stage, the remaining free isocyanate groups are reacted with organic compounds 4) having a molecular weight of from 32 to 399 selected from among amine hydrazine and dihydroxy chain extenders.

In the process for the production of PVA/PUR block copolymers, the poly-vinylarenes obtained by anionic polymerization, preferably poly(styrene) carboxylic acids can be converted into the corresponding carboxylic acid halides, preferably carboxylic acid chlorides and finally be reacted in the melt or in an inert organic solvent such as toluene with aliphatic diols, preferably ethylene glycol, butane diol or hexane diol to form the corresponding hydroxyalkylcarboxylic acid ester.

Hydroxy functional poly-vinylarene carboxylic acid derivatives are also preferably obtained by reacting poly-vinylarene carboxylic acid anhydrides in an inert solvent which preferably forms an azeotrope with water with amino alcohols, preferably ethanolamine, while azeotropically removing any water formed to form the corresponding hydroxy-alkyl carboxylic acid diimides.

These hydroxy functional poly-vinylarene carboxylic acid derivatives are then reacted in an inert solvent at from 50° to 150° C., preferably at from 70° to 120° C. or in the melt at from 100° to 200° C., preferably at from 130° to 170° C. with diisocyanates, preferably diphenylmethane diisocyanates, naphthylene diisocyanate, toluylene diisocyanate, isophorone diisocyanate or hexamethylene diisocyanate, particularly preferably diphenylmethane-4,4-diisocyanate to form NCO prepolymers and subsequently with a quantity approximately equivalent to the NCO groups present of a chain extender such as butane diol, hexane diol, particularly preferably butane diol and/or high molecular weight dihydroxyl compounds 3).

The mixture can then be kept at the indicated temperature until no more free NCO can be detected by analysis.

The above-mentioned NCO prepolymers from among the hydroxy-functional PVA carboxylic acid esters or imides can also be reacted, in a process which is also preferred, first with higher molecular weight dihydroxy compounds 3), preferably with polyester diols, $C_3$ or $C_4$ polyether diols having a molecular weight from 1,000 to 3,000 in a deficit such that still free isocyanate groups are present in the mixture after termination of this reaction. These are then reacted, in the manner described above, with an approximately equivalent quantity of a chain extender. The preferably used polyester diols are those aliphatic or aliphatic-aromatic linear polyesters of dicarboxylic acids and diols of the type usually used, for example for thermoplastic polyurethanes.

An additional preferred process for the production of PVA-NCO prepolymers is one which the PVA carboxylic acids or anhydrides (preferably polystyrene carboxylic acid or anhydrides) are reacted directly in a high boiling solvent or preferably in the melt at a temperature above 150° C. but, to avoid undesirable side reactions, not substantially above the melting point, therefore below about 180° C., with aromatic or aliphatic diisocyanates, preferably diphenylmethane diisocyanate or toluylene diisocyanate or the NCO prepolymers thereof. Amide bonds between the polystyrene radical and the diisocyanate are formed during the reaction with $CO_2$ elimination. After termination of $CO_2$ evolution, one of the two of the above mentioned variations can be followed. The particular advantage of this reaction control lies in the simplicity of implementation and in the saving of the preceding stages for the production of the hydroxy-functional PVA (preferable PS) carboxylic acid esters or imides.

White to slightly yellowish crystalline or amorphous solids materials which melt without decomposition at about 150° to 200° C. are obtained by the process according to the invention. Heat analysis shows the presence of separate crystallization of the PVA and PUR segments. The signals for PVA and also the characteristic absorption bands for urethane and amide bonds are detected in IR spectroscopy. The content of block copolymers can be determined exactly by the method of separating liquids (quotation: R. Kuhn, Makromol. Chem. 181 (1980), P. 725).

The reactions take place at a temperature of from 20° to 200° C., preferably from 50° to 150° C.

The conventional catalysts known for isocyanate reactions may optionally be added in quantities of from 0.1 to 10%, based on the total quantity of monomers.

Completion of the reaction can be determined when no more free isocyanate groups are detected by analysis (IR).

PVA/PUR block copolymers which may be dissolved are isolated by known processes, for example by removing the solvent, preferably by applying a vacuum at elevated temperatures or by precipitation from the solution by addition of a solvent or in a solvent in which the polymer is insoluble.

To complete the reaction and to improve the mechanical properties the PVA/PUR block copolymers according to the invention may be annealed at a temperature of from 50° to 150° C., preferably from 70° to 120° C. for a period of from 0.1 to 24 hours, preferably from 1 to 5 hours.

The PVA/PUR block copolymers obtainable according to the invention may be processed, after purification and drying and optionally annealing, in conventional mixing unit such as rollers, kneaders, single- and multiple-shaft extruders as well as Bambary to form shaped articles.

The processing temperature should not exceed 250° C. The copolymers of the invention may also be mixed in any ratio with thermoplastic polyurethanes and/or isotactic and/or atactic polystyrene. In this case, the PVA/PUR block copolymers according to the invention may be employed for a particularly worthwhile technical use, as coupling agents, compatibility improvers or dispersants in otherwise incompatible or poorly compatible thermoplastic polymer mixtures such as polystyrene/thermoplastic polyurethane elastomer blends. These uses are a further object of the invention.

The technological progress achieved by using the PVA/PUR block copolymers of the invention may be determined by, among others, measuring the torsional separation resistance between polystyrene and polyurethane sandwich boards. If only a mixture of polystyrene (PS) and PU is used as an adhesive layer between these boards, only slight resistance to torsional separation is obtained. If 10% of the PVA/PUR block copolymers according to the invention are added into the adhesive layer, the resistance to torsional separation increases considerably.

The effect of the PVA/PUR block copolymers according to the invention as polymer dispersant can also be demonstrated by light-microscopy observation of PS/PU blends. Although an irregular distribution composed of more or less large units is observed with these blends without using polymer dispersants, standardization and reduction of the phases is observed after addition of 10% of the PVA/PUR block copolymers according to the invention.

The invention is further illustrated but is not intended to be limited by the following examples in which all parts and percentages are by weight unless otherwise specified.

EXAMPLES

I. General instructions for experimentally producing carboxymonofunctional polystyrene carboxylic acids.

| Autoclave 40 1; $N_2$; RT | | |
|---|---|---|
| a) Example of a formulation (MW = 2000) | | |
| Cyclohexane | (ml) | 18000 ($H_2O$-content < 2ppm) |
| Styrene | (ml/g/mol) | 1584/1440/13.8 |
| THF | (ml) | 1500 ($H_2O$-content < 2ppm) |
| Temperature | (°C.) | 0 |
| Butyl Li | (ml/mmol) | 276.8/692 (diluted with 500 ml cyclohexane) |
| Reaction Time | (h) | 2 |
| $CO_2$ | (bar) | 10 (autoclave) |
| With $CO_2$ | (min) | 5 |
| $CH_2COOH/H_2O$ | (ml/min) | 500/1000 |
| b) Example of a formulation (MW = 5000) | | |
| Cyclohexane | (ml) | 18000 ($H_2O$-content < 2ppm) |
| Styrene | (ml/g/mol) | 1584/1440/13.8 |
| THF | (ml) | 1500 ($H_2O$-content < 2ppm) |
| Temperature | (°C.) | 0 |
| Butyl Li | (ml/mmol) | 115.2/288 |
| Reaction Time | (h) | 2 |
| $CO_2$ | (bar) | 10 (autoclave) |
| Reaction Time With $CO_2$ | (min) | 15 |
| $CH_2COOH/H_2O$ | (ml/ml) | 240/500 |
| c) Example of a formulation (MW = 10000) | | |
| Cyclohexane | (ml) | 1800 ($H_2O$-content < 2ppm) |
| Styrene | (ml/g/mol) | 1584/1440/13.8 |
| THF | (ml) | 1500 ($H_2O$-content < 2ppm) |
| Temperature | (°C.) | 0 |

-continued

| Autoclave 40 l; N₂; RT | | |
|---|---|---|
| Butyl Li | (ml/mmol) | 57.6/144 |
| Reaction Time | (h) | 2 |
| $CO_2$ | (bar) | 10 (autoclave) |
| Reaction Time With $CO_2$ | (min) | 15 |
| $CH_2COOH/H_2O$ | (ml/ml) | 120/500 |

II. General instructions for experimentally producing carboxyl difunctional polystyrene carboxylic acids.

| Example of a formulation (bifunctional) (MW = 14000) Flask 0.5 l; N₂; RT | | |
|---|---|---|
| THF | (ml) | 300 |
| α-methylstyrene | (ml/g/Mol) | 60/54.8/0.463 |
| Temperature | (°C.) | −40 |
| Na-naphthenate | (ml/mmol) | 17/4 |
| Reaction Time | (h) | 1 |
| $CO_2$-units | (min) | 10 |
| Reaction Time with $CO_2$ | (min) | 30 |
| 0.2 n HCl | (ml) | 100 |

III. Production of the hydroxy functional polystyrene carboxylic acid esters 100 g of the monofunctional polystyrene carboxylic acid according to Ia is dissolved in 200 ml abs. toluene and refluxed with 20 g (excess) thionyl chloride for 2 hours. Unconsumed thionyl chloride is then distilled off under a vacuum. The quantity of toluene also removed is added and the acid chloride is reacted with 20 g of ethylene glycol (excess). After a further 3 hours with reflux, the product is precipitated in an excess of methanol, washed with methanol and dried.

EXAMPLE 1

PS/PU Block Copolymers 105 g of the hydroxy functional polystyrene carboxylic acid ester according to III is dissolved in 300 g of toluene and reacted with 17.4 g of diphenylmethane diisocyanate (MDI). After 2 hours, the stoichtometric quantity of butane diol-1,4 is added slowly at 80° C. and is stirred for a further 12 hours at 80° C. until no more free isocyanate can be detected. The product was precipitated in methanol, suction filtered, washed and dried.

EXAMPLE 2

105 g of the hydroxy functional PS carboxylic acid ester according to III is dissolved in 300 g of toluene and reacted with 17.4 g of toluylene diisocyanate (toluylene-2,4-diisocyanate). After 2 hours, half of the quantity corresponding stoichiometrically to the content of free isocyanate groups (50 g) of a polyester diol of adipic acid and hexane diol (OH No. 56, molecular weight 2,000) is added slowly at 80° C. After 2 hours at 80° C., the quantity of hexane diol 1,6 corresponding to the remainder of free isocyanate groups (3 g) is slowly added and is stirred for a further 12 hours at 80° C. until no more free isocyanate can be detected. The product is precipitated in methanol, suction filtered, washed and dried.

EXAMPLE 3

700 g of the polystyrene carboxylic acid according to II) with an acid number of 56 are melted under nitrogen at 150° C. 37.5 g of MDI are then added slowly at this temperature. Evolution of gas ($CO_2$) which stops after about 15 minutes is observed. After a further 30 minutes, 112 g of a polyester diol, also adipic acid and butane diol (OH No. 50, mg KOH/g of substance) are added and stirred for a further 2 hours at 150° C. 4.5 g of butane diol are subsequently added to this NCO prepolymer containing polystyrene blocks, are rapidly stirred and the mixture is poured into a teflon tub and subsequently annealed at 80° C. for 2 hours.

EXAMPLE 4

Blending of the PS/PU block copolymers with polystyrene having a molecular weight of 290,000 and/or a thermoplastic PU (Desmopan from Bayer AG, Leverkusen).

The mixtures were produced in a plastograph under the following conditions:
Temperature=240° C. (±5° C.)
Quantity=50 g
Compounding Time=15 rain
RPM=25

The compounded samples are taken in the still hot flexible state using a spatula and are dried for 1 hour at 130° C. under a vacuum.

These samples are then used for measuring the torsional separation resistance.

Sandwich samples of PU (Desmopan 359 produced by Bayer AG) and polystyrene with an intermediate film are produced by pressing for 15 minutes at 240° C. in a heating press. If a polyurethane polystyrene block copolymer with 59% by weight of polystyrene segments and 41% by weight of polyurethane segments according to Example 2 is used for the intermediate film, a separation resistance of 16 mPa is observed. If a block copolymer of PU/PS containing 6% by weight of PS is used as the intermediate film, a separation resistance of 14 mPa is measured. Finally, when using a PU/PS block copolymer containing 92% by weight of polystyrene, a separation resistance of 13 mPa is attained. If the intermediate film is composed only of a PU/PS blend in a ratio by weight of 1:1, a separation resistance of only 8 mPa is measured.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastically processible poly-vinylarene/-polyurethane block copolymer comprising the reaction product of
    a) a poly-vinylarene having a weight average molecular weight of from 1,000 to 350,000 produced by anionic polymerization and containing one group capable of reacting with isocyanate groups, with
    b) a member selected from the group consisting of organic diisocyanates and corresponding isocyanate prepolymers, and at least one member selected from the group consisting of
    c) high molecular weight diols having a molecular weight of from 400 to 5000, and
    d) organic difunctional chain extending compounds having a molecular weight of from 32 to 399.

2. The block copolymers of claim 1, wherein said poly-vinylarene is polystyrene.

3. The copolymers of claim 1 wherein said chain extending compound is at least one member selected from the group consisting of organic dihydroxy compounds, difunctional amino alcohols and difunctional amines.

4. A process for the production of a poly-vinylarene/polyurethane block copolymer comprising reacting
   a) a poly-vinylarene having a weight average molecular weight of from 1,000 to 350,000 which has been obtained by anionic polymerization and contains one group capable of reacting with isocyanate groups, with
   b) at least one member selected from the group consisting of organic diisocyanates and corresponding isocyanate prepolymers and at least one member selected from the group consisting of
   c) high molecular weight diols having a molecular weight of 400 to 5000 and
   d) organic difunctional chain extending compounds having a
   molecular weight of from 32 to 399.

5. The process of claim 4 wherein said chain extending compound is a member selected from the group consisting of organic dihydroxy compounds, difunctional amino alcohols and difunctional amines.

* * * * *